Nov. 27, 1934.  Z. WILLIAMS  1,982,038
COMBINED SCRAPER AND CULTIVATOR
Filed May 22, 1933
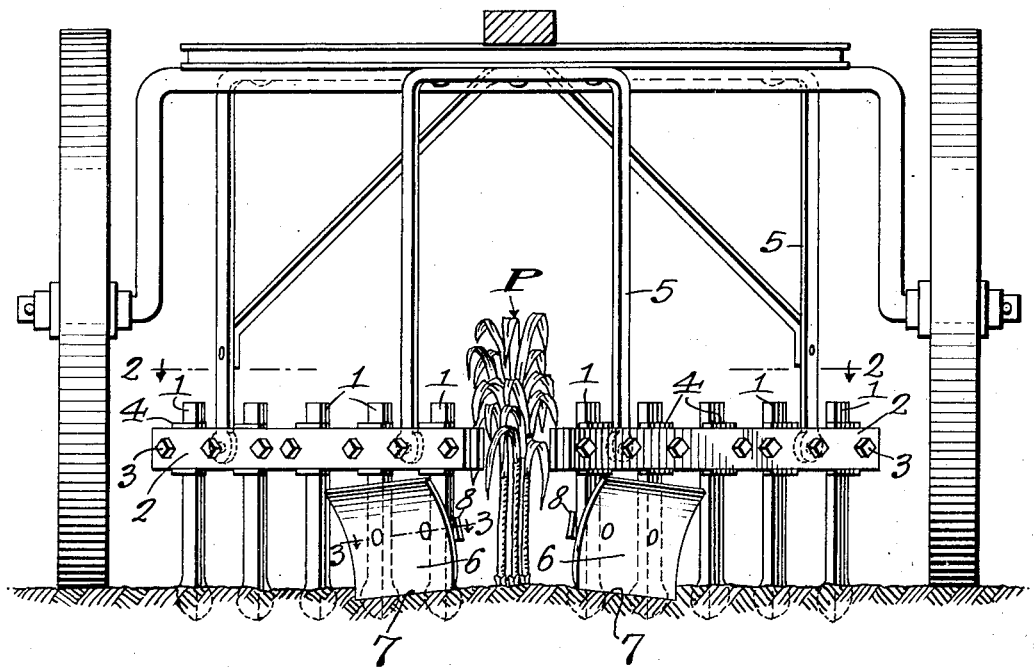
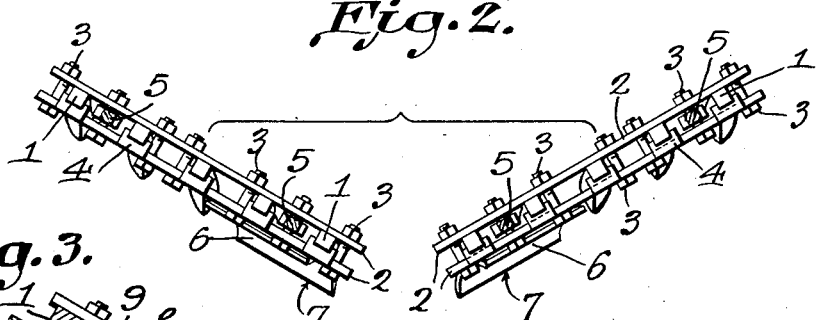
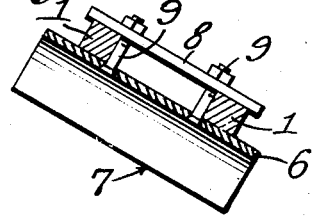
Z. Williams Inventor Patented Nov. 27, 1934

1,982,038

UNITED STATES PATENT OFFICE 1,982,038

COMBINED SCRAPER AND CULTIVATOR

Zabdiel Williams, Fruitvale, Tenn.

Application May 22, 1933, Serial No. 672,290

1 Claim. (Cl. 97—9)

This invention relates to a combined scraper and cultivator designed not only for cultivating the soil between rows but also for scraping the soil away from the sides of the hills for the purpose of removing grass and other undesirable vegetation.

It is an object of the invention to provide a scraping blade adapted to be attached to the teeth of a cultivator whereby it can be held in any desired position relative to the surface of the soil, the blade being readily adjustable and being properly supported without the use of any special supporting means.

A still further object is to provide scraper blades which, when attached to a cultivator, obviate the necessity of using a special scraper for use independently of the cultivator.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing:

Figure 1 is an elevation of a riding cultivator having scraping blades attached to the teeth thereof.

Figure 2 is a section on line 2—2, Figure 1.

Figure 3 is an enlarged section on line 3—3, Figure 1.

Referring to the figures by characters of reference 1 designates the shanks or standards of two gangs of cultivator teeth, these shanks being arranged in series which can be disposed at any desired angles to each other. The shanks of each series are gripped between parallel bars 2, there being clamping bolts 3 which join the bars and serve to bind them upon the teeth and upon clamping blocks 4 engaging the teeth.

The cultivator is of any desired construction. The form illustrated is a riding cultivator wherein the bars 2 are suspended from yokes 5 carried by the frame of the cultivator. Furthermore the yokes are so arranged that the bars will support the series of teeth along forwardly converging lines, their forward ends being spaced apart a sufficient distance to leave a row of standing plates P undisturbed during the cultivating operation.

It is preferred to use two scraping blades in connection with the cultivator, one of those being located upon the forward portion of each series of teeth. Each blade comprises a plate 6 bowed from its upper to its lower edge and straight from side to side the lower edge of each blade is sharpened as at 7 so as to cut or scrape the soil in an efficient manner. Arranged back of each of the plates 6 is a clamping bar 8 and this bar is connected adjustably to its blade by bolts 9.

Each of the scraping blades 7 is arranged in front of two of the shanks 1 and the bar 8 is extended back of these shanks. By then tightening the bolts 9 the shanks 1 will be gripped tightly between blade 6 and bar 8. It is preferred to have the bolts 9 so spaced that they will engage the sides of the respective shanks 1, thereby to hold the blade and bar against lateral displacement relative to the teeth.

Each blade can be arranged at any desired angle to the shanks 1 and at any desired distance from the points of the teeth. As shown in Figure 1 the blades are inclined downwardly and rearwardly and are located with their lower edges slightly above the level of the points of the teeth. As the blades are attached to the forward teeth of the two series, it will be apparent that when the cultivator is pulled forwardly astride a row the blades 6 will engage the surface soil at opposite sides of the hill and remove undesirable vegetation that is adjacent to the growing plants P. If the teeth are extended below the scrapers they will loosen the soil following the scraping action. Thereafter the blades can be removed from the cultivator and said cultivator used solely for loosening the soil.

Importance is attached to the fact that no special supporting means is provided for the scraping blades; that these blades can be held at any desired angles to the surface of the ground and at any distances desired above or below the points of the teeth; and that by the use of these blades the employment of a special scraping machine becomes unnecessary.

What is claimed is:

A cultivator for simultaneously scraping and scarring an area of predetermined width, including a frame, cultivator teeth having shanks connected to the frame, a bowed scraping blade in front of the shanks, each blade being straight from side to side and having a bottom scraping edge, a clamping bar back of the engaged shanks, and means extending between said shanks and adjustably connecting the blade to the bar for binding the bar and blade upon the shanks and for holding the blade against lateral displacement relative to the shanks, the teeth on the engaged shanks being extended below the scraping edge of the blade to scar the area scraped by the blade.

ZABDIEL WILLIAMS.